No. 668,384. Patented Feb. 19, 1901.
F. W. MORGAN.
VEHICLE WHEEL.
(Application filed July 24, 1899.)
(No Model.)
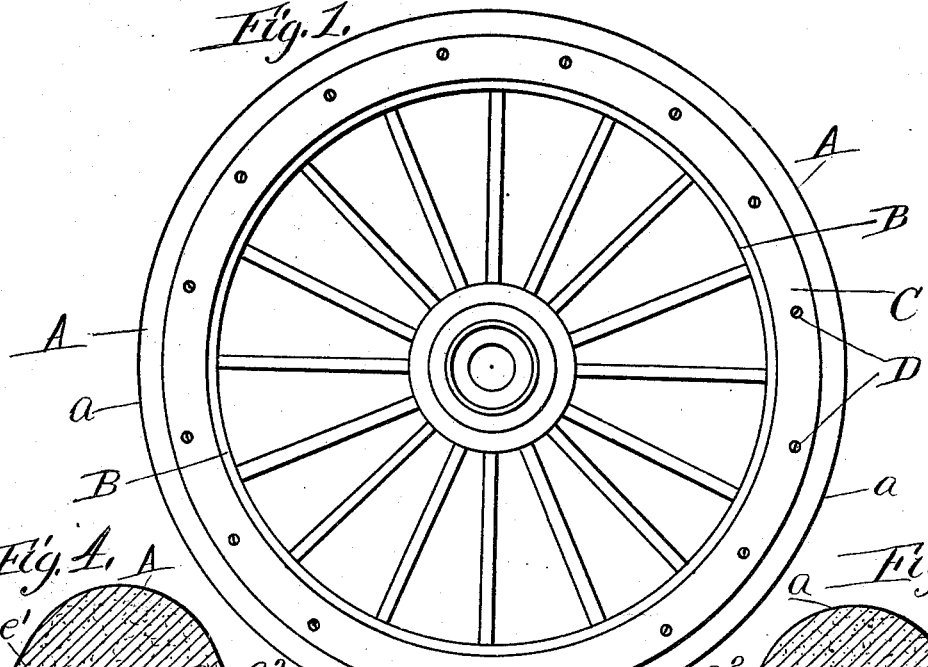
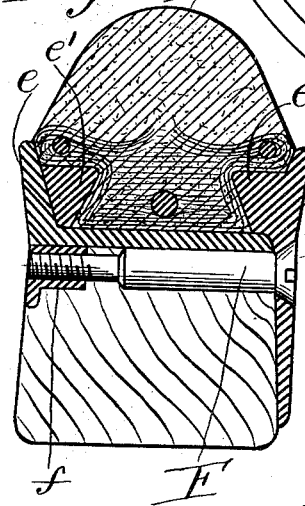
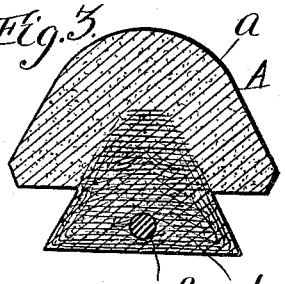
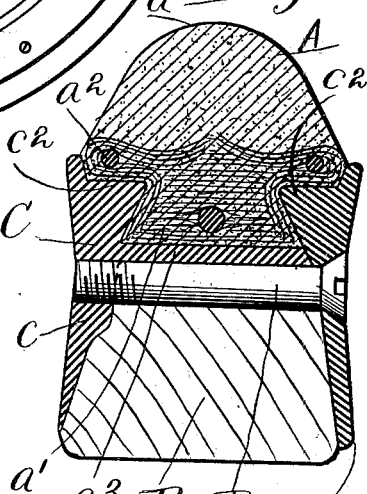
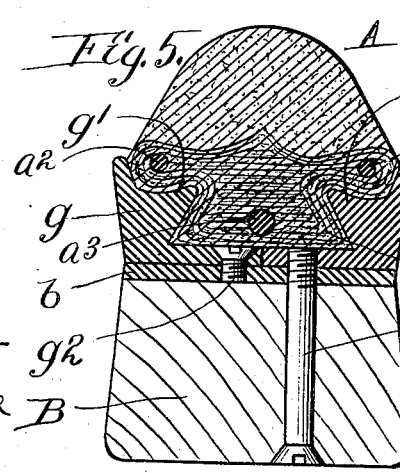
Witnesses:
A. F. Durand
A. A. Devine
Inventor:
Fred W. Morgan.
by Chas L. Page
Atty.

UNITED STATES PATENT OFFICE.

FRED W. MORGAN, OF CHICAGO, ILLINOIS.

VEHICLE-WHEEL.

SPECIFICATION forming part of Letters Patent No. 668,384, dated February 19, 1901.

Application filed July 24, 1899. Serial No. 724,938. (No model.)

*To all whom it may concern:*

Be it known that I, FRED W. MORGAN, a citizen of the United States, residing at Chicago, in the county of Cook, State of Illinois, have invented a certain new and useful Improvement in Vehicle-Wheels, of which the following is a specification.

My invention relates to vehicle-wheels having elastic tires, and more particularly to elastic-tired wheels which are employed as traction-wheels for automobiles.

The objects of my invention are to provide an elastic-tired wheel adapted for efficient service as an automobile traction-wheel and to provide a construction in which the elastic tire will have no tendency whatever to creep or shift circumferentially upon the felly-rim, to provide a construction which will permit a ready removal or replacement of the tire and which will obviate the necessity of making the tire in the form of a straight length and securing the same upon the wheel-rim by butting its ends and then joining the ends of the retaining bands or wires, which are usually provided and arranged to extend longitudinally through the tire, to effectually prevent lateral shift on the part of the tire, and to provide certain details tending to render a wheel of this character serviceable and thoroughly reliable.

To the attainment of the foregoing and other useful ends my invention consists in matters hereinafter set forth and claimed.

In the accompanying drawings, Figure 1 represents in side elevation a vehicle-wheel provided with a rim and an annular elastic tire embodying the principles of my invention. Fig. 2 is a cross-section, on a larger scale, of the tire, rim, and felly shown in Fig. 1. Fig. 3 is a view illustrating in cross-section a different form of tire. Figs. 4 and 5 illustrate different forms of construction of the felly-rim.

The elastic tire A, which is preferably annular or ring-like in form, is preferably composed of rubber and fabric and may be molded into such annular form and then vulcanized by means of any suitable apparatus. It will be observed that the tread $a$ of the tire is composed of rubber, while its base or seating portion $a'$ is composed chiefly of superimposed layers of fabric. A couple of annular bands or wires $a^2$ are arranged to extend through the side portions of the tire, and, if so desired, a relatively larger band or wire $a^3$ may be provided and arranged to extend through the tire at a point near the center of its base. By referring to Fig. 3 it will be seen that the wheel comprises a felly B and a felly-rim C and also that the relative formation of the latter and the tire is such that the two may be said to be secured together with a dovetail joint. The said felly can be of wood, metal, or any other suitable material, and the felly-rim C, which is preferably of metal, is composed of a couple of oppositely-arranged and annular cheek-plates $c\,c'$. These cheek-plates have their peripheries or outer portions provided with inwardly-projecting shoulders or ledges $c^2$, and the plate $c$ is provided with a web or flange $c^3$, which extends across and covers the periphery of the felly B. The cheek-plates and the felly are held together by means of a number of bolts D, which are preferably inserted through the plates immediately inside of the line of juncture between the latter and the web $c^3$, and which serve also as keys to lock the felly and felly-rim against relative rotation. These bolts or screws have their end portions threaded to engage threaded openings in the annular cheek-plate C, and in this way they serve as tie-bolts, and their rotation therefore operates to clamp both the tire and felly tightly between their opposing surfaces. The base of the tire, which is, as before stated and as will be observed by reference to the drawings, flaring or dovetail in form, is compressed by the clamping or drawing together of the cheek-plates, and it is for this reason and with a view to insuring a requisite degree of compression that the base of the tire is preferably somewhat greater in width than the channel of the felly-rim. In this way the base of the tire, which is composed chiefly of fabric, will be compressed to an extent to prevent circumferential creep or rotation of the tire upon the felly-rim, and such compression will, together with the dovetail formation of the tire and rim, serve or operate to maintain the tire in place—that is to say, the compression and the dovetail character of the joint between the tire and rim will effectually prevent the two from separating.

The shoulders $c^2$ support the overhanging side portions of the tire when the latter is seated and compressed within the channel of the rim, and at this juncture it will be seen that these side portions of the tire are held in place by the annular bands or wires $a^2$. These wire rings or annular bands, which extend around through the tire at points just outside of and above the said shoulders, and which are each preferably inclosed within a sort of loop of fabric, (see Fig. 2 and the other cross-sections,) serve to strengthen the tire and prevent it from shifting sidewise when subjected to lateral strain. The wire or band $a^3$, which extends around through the flaring base of the tire, will, if employed, serve to further strengthen and stiffen the tire and render it less liable to be sprung or forced from the channel of the felly-rim. The cheek-plate $c$, which is provided with the web $c^3$, can be shrunk upon the felly B, and after so doing it will only be necessary to first place the annular tire upon the wheel and adjust the plate $c'$ into place and to then insert the bolts D and tighten them up for the purpose of compressing the tire. This construction and arrangement obviates the necessity of making the tire in the form of a straight length, and consequently it also obviates the necessity of tightening up the retaining-wires and joining their opposite ends for the purpose of securing such length of tire upon the wheel. As previously stated, the elastic tire is preferably composed of rubber and fabric, and accordingly the base portion of the tire and also the overhanging lateral or side portions may be built up and constructed for the most part of friction-duck or the like, while the outer or tread portion of the tire can be composed of rubber or its equivalent. In this way the tire is provided with a base portion of a sufficiently unyielding nature to when compressed by the cheek-plates effectually prevent the tire from creeping or shifting circumferentially upon the rim. The dovetail joint makes it impossible for the tire to be forced or sprung from the rim, and the annular wires $a^2$ prevent the tire from rolling or shifting sidewise when subjected to lateral strain.

In Fig. 4 the tire is the same as in the preceding figures; but in this case the rim E consists of three parts instead of two, and the bolts are provided with nuts instead of being screwed into a cheek-plate. In this figure the said rim comprises the portion $e$, which is shrunk or otherwise secured upon the periphery of the felly, an annular ring $e'$, which serves as one of the shoulders, and a cheek-plate $e^2$, which is provided with a shoulder $e^3$. The bolts F are inserted through the felly and cheek-plate and are retained in place by nuts or washers $f$. With this arrangement the portion $e$ is first secured to the periphery of the felly, and the annular ring $e'$ is then adjusted into place to provide such portion with an inwardly-projecting shoulder, similar in form and function to one of the shoulders $c^2$ of Fig. 3. Next the elastic tire is placed upon the wheel and the cheek-plate $e^2$ then adjusted into place at the side of the tire and felly. After this the bolts are inserted and rotated for the purpose of drawing the two portions of the rim together, such clamping action operating to compress the base of the tire in the manner previously described.

Still another way of constructing the rim is shown in Fig. 5. In this case the rim G is made in two parts or halves $g\ g$, which are substantially alike, and each part or half is provided with an inwardly-projecting shoulder $g'$. It will be observed, however, that the said shoulders are, unlike the shoulders of the preceding figures, peripherally grooved and adapted to receive the overhanging side portions of the tire. The wires $a^2$ keep these overhanging side portions of the tire firmly seated within the said grooves, and this arrangement is instrumental in still further preventing the tire from rolling or shifting sidewise when subjected to lateral strain. Also in this case an annular band or hoop $b$ is shrunk upon the periphery of the felly and one half of the rim is secured to such band by means of short screws $g^2$. The other half of the rim, which is of course removable, is retained in place by means of a number of bolts or screws H, which are inserted radially through the felly and band $b$ and which have their end portions threaded to engage threaded openings in the base of such removable half of the rim. It will be seen, however, that this construction necessitates the use of a clamp or the like for adjusting the removable half of the rim into place, so as to compress the tire, and that the bolts cannot be inserted until the threaded openings in such portion of the rim have been thus brought into register with the bolt-holes in the felly and band $b$.

It will be understood that while I have shown the metal rings $a^2$ as being made of wire, I may employ rings or endless bands made of flat metal or any other shape without departing from the spirit of my invention. While I have shown the wires $a^2$ embedded in portions of the compressed fabric base, the latter can be formed so as to be embedded in the body of the tire, as in Fig. 3, in which case the wires if used will be embedded in the rubber or, as in said figure, the side wires can be omitted. The tire may also be made in sections with their ends butted together, and in such case the wires may also be in corresponding sections or lengths. This may be desirable in cases of large wheels.

What I claim as my invention is—

1. The combination of a rim provided with inwardly-projecting shoulders, a substantially solid and elastic tire seated within said rim and provided with overhanging lateral or side portions which seat upon said shoulders, and a couple of wires extending around through the tire and arranged to hold the said side portions of the tire upon the said shoulders.

2. In combination with a suitable rim the elastic vehicle-tire A provided with a rubber tread $a$, a flaring base $a'$, and overhanging lateral or side portions provided with wires $a^2$.

3. In combination with a suitable rim, the elastic tire A provided with a rubber tread and a flaring base $a'$, and having also overhanging lateral or side portions which are provided with wires $a^2$ and which are, together with the said base portion, composed of superimposed layers of fabric, substantially as shown and described.

4. In combination with a suitable rim, an annular, endless and substantially solid tire which is provided with a rubber tread, a flaring base portion of fabric, and which is also provided with overhanging lateral or side portions provided with metal rings or endless bands which extend around through the said side portions of the tire, substantially as described.

5. The combination of a rim provided with shoulders $c^2$, an annular, endless and substantially solid tire seated upon said rim and provided with overhanging lateral or side portions which are held in place upon said shoulders by means of the metal rings or endless bands $a^2$.

6. The combination of a rim provided with shoulders $c^2$, an annular, endless and substantially solid tire having a flaring base portion composed of fabric and having also overhanging lateral or side portions which are held in place by wires $a^2$, the latter being inclosed in loops formed from the said fabric.

7. A tire composed of rubber and fabric and molded or formed upon a couple of metal rings or endless bands, a separable rim adapted to receive and compress the said tire and having inwardly-projecting shoulders which afford seats for portions of the said tire which are held thereon by the metal rings or bands.

8. A substantially solid tire provided with a base portion which is composed of fabric and which is provided with lateral grooves, the overhanging lateral or side portions formed by thus grooving the tire being provided with metal bands or wires which are embedded and inclosed within loops formed of the said fabric, and the tread portion of the tire being composed of rubber or rubber composition which is vulcanized to the said fabric.

9. An elastic tire having a rubber or rubber-composition tread and a base portion which is composed of superimposed layers of fabric, the whole being molded and vulcanized together, and the overhanging lateral or side portions of the tire, which are formed by grooving the sides of the base portion of the tire, being provided with metal bands or wires which are inclosed and embedded within laterally-extending loops or folds formed of one or more layers of the said fabric, substantially as described.

FRED W. MORGAN.

Witnesses:
ELTON W. McCASLIN,
WM. F. SYLVESTER.